United States Patent [19]

Hasuo et al.

[11] Patent Number: 4,794,158

[45] Date of Patent: Dec. 27, 1988

[54] TRANSPARENT COPOLYAMIDE FROM BIS(3-METHYL-4-AMINO-CYCLOHEXYL)METHANE

[75] Inventors: Masayoshi Hasuo, Yokohama; Hiroshi Urabe, Kawasaki, both of Japan; Michio Kawai, Amherst, Mass.; Tatsuya Ohsako, Yokohama, Japan

[73] Assignee: Mitsubishi Kasei Corporation, Tokyo, Japan

[21] Appl. No.: 130,241

[22] Filed: Dec. 8, 1987

[30] Foreign Application Priority Data

Dec. 9, 1986 [JP] Japan .................................. 61-292749

[51] Int. Cl.$^4$ .............................................. C08G 69/26
[52] U.S. Cl. ..................................... 528/338; 528/339; 528/340; 528/346; 528/347; 528/349
[58] Field of Search ............... 528/338, 339, 340, 346, 528/347, 349

[56] References Cited

U.S. PATENT DOCUMENTS

| | | | |
|---|---|---|---|
| 3,597,400 | 8/1971 | Kashiro et al. | 260/76 R |
| 4,232,145 | 11/1980 | Schmid et al. | 528/324 |
| 4,264,742 | 4/1981 | Cordes et al. | 528/338 |
| 4,369,305 | 1/1983 | Pagilagan et al. | 528/338 |
| 4,684,713 | 8/1987 | Kohyama et al. | 528/315 |

FOREIGN PATENT DOCUMENTS

0221755 10/1986 European Pat. Off. .

*Primary Examiner*—Harold D. Anderson
*Attorney, Agent, or Firm*—Ernest V. Linek; David G. Conlin

[57] ABSTRACT

Disclosed herein is a transparent copolyamide which comprises constitutional units derived from a diamine component comprising (a) bis(3-methyl-4-aminocyclohexyl)methane and (b) hexamethylenediamine and a dicarboxylic acid component comprising (c) isophthalic acid and (d) terephthalic acid, the molar ratio of said components simultaneously satisfying the following two formulas:

(a):(b) = 3:97 to 18:82

(c):(d) = 60:40 to 90:10 and relative viscosity of said copolyamide being 1.9 to 2.5 as measured at 25° C. and a concentration of 1 g/dl in 98% concentrated sulfuric acid.

The transparent copolyamide according to the present invention shows a sufficient resistance to alcohols, a sufficient resistance to boiling water and high moldability, therefore, is useful as the material for molded articles such as parts in automobiles, electronic and electric appliances and machines.

6 Claims, No Drawings

TRANSPARENT COPOLYAMIDE FROM BIS(3-METHYL-4-AMINO-CYCLOHEXYL)METHANE

BACKGROUND OF THE INVENTION

The present invention relates to a copolyamide resin exhibiting excellent transparency. More particularly, the present invention relates to a transparent copolyamide resin which is produced by copolymerizing specific starting materials for polyamide, in specific proportions, and which has resistance to alcohols and resistance to boiling water together with high moldability.

The polyamide resin, owing to its well known excellence in such properties as rigidity, toughness, resistance to heat, and resistance to chemicals, has firmly established its fame as an engineering plastic. Among other species of polyamide resin, the transparent polyamide resin has been finding rapidly growing utility in a wide variety of applications in recent years because the transparent polyamide resin shows outstanding transparency and, at the same time, retains most of the highly desirable properties inherent in the polyamide resin.

The heretofore known varieties of transparent polyamide resin, however, suffer invariably from several drawbacks.

For example, the polyamide which comprises an alkyl-substituted hexamethylenediamine and isophatalic acid and/or terephthalic acid and the polyamide which, as disclosed in U.S. Pat. No. 4,264,762, comprises bis(3-methyl-4-aminocyclohexyl)methane and isophthalic acid and lactam exhibits poor in resistance to methanol and ethanol.

The polyamide which comprises bis(4-aminocyclohexyl)methane and isophthalic acid and the polyamide which, as disclosed in U.S. Pat. No. 3,597,400, comprises bis(4-aminocyclohexyl)methane, hexamethylenediamine, terephthalic acid, and isophthalic acid, possesses high melt viscosity, but exhibits very poor moldability.

The polyamide which comprises hexamethylenediamine and isohthalic acid and/or terephthalic acid blushes when it is treated in boiling water.

As described above, none of the transparent polyamides so far developed shows sufficient resistance to alcohols, resistance to boiling water, and retains high moldability altogether.

The present inventors, in appreciation of the true state of affairs described above, have continued a study in search of a transparent polyamide resin which shows resistance to alcohols, resistance to boiling water, and retains high moldability. As the result of their study, the present inventors have found that a transparent copolyamide which comprises constitutional units derived from a diamine component comprising (a) bis(3-methyl-4-aminocyclohexyl)methane and (b) hexamethylenediamine and a dicarboxylic acid component comprising (c) isophthalic acid and (d) terephthalic acid, the molar ratio of the aforementioned components simultaneously satisfying the following two formulas:

(a):(b)=3:97 to 18:82

(c):(d)=60:40 to 90:10 and relative viscosity $n_{rel}$(eta) of the copoloyamide being 1.9 to 2.5 as measured at 25° C. and a concentration of 1 g/dl in 98% concentrated sulfuric acid, can satisfy, at the same time, all of the requirements mentioned above.

SUMMARY OF THE INVENTION

In one embodiment of the present invention there is provided a transparent copolyamide which comprises constitutional units derived from a diamine component comprising (a) bis(3-methyl-4-aminocyclohexyl)methane and (b) hexamethylenediamine and a dicarboxylic acid component comprising (c) isophthalic acid and (d) terephthalic acid, the molar ratio of said components simultaneously satisfying the following two formulas:

(a):(b)=3:97 to 18:82

(c):(d)=60:40 to 90:10 and relative viscosity of said copolyamide being 1.9 to 2.5 as measured at 25° C. and a concentration of 1 g/dl in 98% concentrated sulfuric acid.

DETAILED DESCRIPTION OF THE PREFERRED EMBODIMENT

The transparent copolyamide according to the present invention comprises constituent units derived from a diamine component comprising (a) bis(3-methyl-4-aminocyclohexyl)methane and (b) hexamethylenediamine and a dicarboxylic acid component comprising (c) isophthalic acid and (d) terephthalic acid.

The bis(3-methyl-4-aminocyclohexyl)methane to be used in the present invention generally occurs as a mixture of three stereoisomers. Any mixture of such stereoisomers may be used in the present invention.

The method for the mixing of the individual starting materials prior to polymerization is not specifically limited.

For example, a method which comprises independently preparing salts of a diamine and a dicarboxylic acid in advance and mixing the salts in prescribed amounts prior to polymerization or a method which comprises preparing an aqueous diamine solution containing bis-(3-methyl-4-aminocyclohexyl)methane and hexamethylenediamine in prescribed amounts, keeping the aqueous amine solution heated and, at the same time, adding isophthalic acid and terephthalic acid in prescribed amounts to the heated solution, thereby forming an aqueous mixed nylon salts solution, may be employed.

Here, the molar ratio of bis(3-methyl-4-aminocyclohexyl)methane to hexamethylenediamine may range from about 3:97 to 18:82, preferably from 3:97 to 12:88 and more preferably from 3:97 to 10:90. If this molar ratio is less than about 3:97, the produced polyamide is subject to blushing during treatment with boiling water. Conversely, if the molar ratio exceeds about 18:82, the produced polyamide acquires undesirably high melt viscosity and suffers from poor moldability.

The molar ratio of isophthalic acid to terephthalic acid may range from about 60:40 to 90:10, preferably from 65:35 to 85:15. If this molar ratio is less than about 60:40, the produced polyamide lacks transparency and fails to fulfill the object of the present invention. Conversely, if the molar ratio exceeds about 90:10, the produced polyamide lacks resistance to alcohols.

The polymerization can be carried out by the melt polymerization method which is used for the production of nylon 6 and nylon 66.

Preparatory to the polymerization, a monovalent viscosity regulating agent such as monoamine and monocarboxylic acid may be added, when necessary, to the mixed nylon salt or an aqueous solution thereof. Hexamethylenediamine may be added slightly in excess of the equivalent amount because hexamethylenediamine is very volatile during the course of polymerization.

The reaction of melt polymerization is preferably carried out with the reaction temperature kept in the range of 150° to 300° C. The reaction pressure kept in the range of 2 to 15 kg/cm² during the early to middle stage of the reaction in which the amount of the residual water is large and kept at normal pressure or in the range of 200 to 700 Torr during the terminal stage of the reaction.

The relative viscosity, $n_{rel}$(eta), of the produced polyamide resin, measured at 25° C. in a concentration of 1 g/dl in 98% concentrated sulfuric acid, is in the range of about 1.9 to 2.5, preferably 2.0 to 2.4. If $n_{rel}$(eta) is not more than 1.9, the produced polyamide resin fails to retain the toughness required for a polymer. If $n_{rel}$(eta) exceeds about 2.5, the produced polyamide resin possesses too high melt viscosity to be smoothly formed by the conventional injection molding technique.

The copolyamide of the present invention is also characterized by its high moldability and exhibits melt viscosity falling in the range of 5,000 to 24,000 poises at 280° C. at a shear rate of 100 sec$^{-1}$.

Preparatory to the production of the polyamide of the present invention, a linear polyamide component may be added to the system for copolymerization. The amount of the linear polyamide component thus added is desired to be not more than about 20 parts by weight based on 100 parts by weight of the polyamide composition of (a), (b), (c) and (d).

The term "linear polyamide component" as used herein means a lactam having 4 to 12 carbon atoms or a salt between a linear aliphatic diamine having 2 to 10 carbon atoms and a linear aliphatic dicarboxylic acid having 2 to 10 carbon atoms or a mixture thereof.

The copolyamide of the present invention may contain such additives as thermal stabilizer, pigment, glass or mineral reinforcing agent, lubricant, plasticizer, and antioxidant which have been generally used in the conventional polyamides. These additives may be added before or after polymerization in such an amount that transparency, resistance to alcohols, resistance to boiling water, high moldability, etc., of the resulting polyamide is not impaired by the addition.

The transparent copolyamide according to the present invention shows, at the same time, resistance to boiling water, resistance to alcohols and high moldability, and therefore, is highly useful as the starting material for molded articles such as parts in automobiles, electronic and electric appliances and machines. The transparent copolyamide according to the present invention can be molded by any known methods which have been employed for molding the conventional polyamide.

The present invention will be described more precisely by reference to the following non-limitative examples.

The numerical values of various properties mentioned in the examples are the results of determination obtained by the following methods.

(a) Relative viscosity ($n_{rel}$)

This property was determined at 25° C. in a concentration of 1 g/dl in 98% concentrated sulfuric acid.

(b) Melt viscosity

This property was determined at 280° C. at a shear rate of 100 sec$^{-1}$ with a Koka type flow tester using a nozzle 1 mm in diameter and 10 mm in length.

(c) Resistance to boiling water

This property was determined using a test piece 1 mm in thickness by immersing the test piece in boiling water of 100° C. and measuring the time required for the test piece to blush.

(d) Resistance to alcohols

This property was determined using a test piece 1 mm in thickness by keeping the test piece in a strained state at 23° C. in 95% ethanol for 24 hours and measuring the critical strain of the test piece.

(e) Mechanical strength

Test pieces obtained by injection molding were subjected to tensile test, bending test, and Izod impact test respectively by the following methods.

| Tensile test | ASTM D-638 |
| --- | --- |
| Bending test | ASTM D-790 |
| Izod impact test | ASTM D-256 |

EXAMPLE 1

An aqueous diamine solution consisting of 158.5 g of an aqueous 74 wt% hexamethylenediamine solution, 13.1 g of bis(3-methyl-4-aminocyclohexyl)methane and 170.0 g of distilled water was heated to 70° C. and then mixed with 118.0 g of isophthalic acid and 59.0 g of terephtahlic acid to produce a homogeneous nylon salt solution. This nylon salt solution was placed in an autoclave. The solution, after 1.00 g of acetic acid was added thereto, was heated. When the inner pressure of the autoclave reached 2.5 kg/cm², the valve of the autoclave was opened to distill out the water and start concentration of the contents in the autoclave so that the inner pressure is kept at 2.5 kg/cm². When the inner temperature of the autoclave reached 190° C., the valve of the autoclave was closed and the temperature elevation was continued. When the inner pressure reached 14 kg/cm², the valve of the autoclave was opened again to distill out the water and continue the concentration so that the inner pressure is kept at 14 kg/cm². The temperature elevation was continued even during the course of this concentration. When the inner temperature of the autoclave reached 260° C., the inner pressure was released until normal pressure. Thereafter, the reaction was allowed to continue for one hour. At the end of the reaction, the polymer consequently produced was discharged from the autoclave under the pressure of N₂ gas and then pelletized.

The polymer was tested for the various properties mentioned above. The results are shown in Table 1.

EXAMPLES 2 TO 6 AND COMPARATIVE EXPERIMENTS 1 TO 6

Polyamide resins of various compositions indicated in Table 1 were produced by following the procedure of Example 1 and tested for the various properties recited.

The polymer obtained in Comparative Experiment 1 was not suitable as a molding material because it exhibited undesirably high melt viscosity in spite of a low relative viscosity $n_{rel}$(eta).

The polymer of Comparative Experiment 2 was deficient in tensile elongation.

The polymers of Comparative Experiments 3 and 4 were deficient in resistance to boiling water, and the polymer of Comparative Experiment 5 was deficient in resistance to alcohols. The polymer obtained in Comparative Experiment 6 possessed crystallinity and lacked transparency.

TABLE 1

| | Diamine component (molar ratio) Bis(3-methyl-4-aminocyclohexyl)-methane/ Hexamethylene-diamine | Dicarboxylic acid component (molar ratio) Isophthalic acid/ Terephthalic acid | $\eta_{rel.}$ | Melt viscosity (poise) | Resistance to boiling water (hr) | Resistance to alcohol (critical strain (%)) | Tensile strength (kg/cm$^2$) | Tensile elongation (%) | Bending modulus (kg/cm$^2$) | $\frac{1}{4}''$ Izod impact strength |
|---|---|---|---|---|---|---|---|---|---|---|
| Example 1 | 5/95 | 67/33 | 2.05 | 5,800 | >2.0 | 0.8 | 970 | 120 | 27,400 | 5.5 |
| Example 2 | 5/95 | 67/33 | 2.17 | 10,000 | >2.0 | 0.8 | 960 | 170 | 27,300 | 5.4 |
| Example 3 | 5/95 | 67/33 | 2.23 | 19,000 | >2.0 | 1.0 | 960 | 180 | 27,500 | 5.5 |
| Example 4 | 10/90 | 67/33 | 2.03 | 11,000 | >2.0 | 1.0 | 970 | 130 | 28,200 | 5.3 |
| Example 5 | 17.5/82.5 | 67/33 | 2.01 | 21,000 | >2.0 | 1.0 | 970 | 120 | 26,900 | 5.6 |
| Example 6 | 5/95 | 75/25 | 2.22 | 16,000 | >2.0 | 0.8 | 920 | 140 | 27,500 | 5.4 |
| Comparative Experiment 1 | 35/65 | 67/33 | 1.93 | 50,000 | >2.0 | 0.5 | brittle | — | — | — |
| Comparative Experiment 2 | 25/75 | 67/33 | 1.88 | 15,000 | >2.0 | 0.6 | 960 | 45 | 27,900 | 5.4 |
| Comparative Experiment 3 | 2.5/97.5 | 67/33 | 2.31 | 13,500 | 1.0 | 0.8 | 970 | 175 | 27,000 | 5.5 |
| Comparative Experiment 4 | 0/100 | 67/33 | 2.16 | 8,600 | 0.5 | 0.8 | 930 | 170 | 27,900 | 5.0 |
| Comparative Experiment 5 | 5/95 | 95/5 | 2.20 | 10,100 | >2.0 | 0.3 | — | — | — | — |
| Comparative Experiment 6 | 5/95 | 55/45 | opaque | — | — | — | — | — | — | — |

What is claimed is:

1. A transparent copolyamide which comprises constitutional units derived from a diamine component comprising (a) bis(3-methyl-4-aminocyclohexyl)methane and (b) hexamethylenediamine and a dicarboxylic acid component comprising (c) isophthalic acid and (d) terephthalic acid, the molar ratio of said components simultaneously satisfying the following two formulas:

(a):(b)=3:97 to 18:82

(c):(d)=60:40 to 90:10 and relative viscosity of said copolyamide being 1.9 to 2.5 as measured at 25° C. and a concentration of 1 g/dl in 98% concentrated sulfuric acid.

2. The transparent copolyamide according to claim 1, wherein the molar ratio of said compounds (a) and (b) is 3:97 to 12:88.

3. The transparent copolyamide according to claim 1, wherein the molar ratio of said compounds (a) and (b) is 3:97 to 10:90.

4. The transparent copolyamide according to claim 1, wherein the molar ratio of said compounds (c) and (d) is 65:35 to 85:15.

5. The transparent copolyamide according to claim 1, wherein the relative viscosity of said polyamide is 2.0 to 2.4.

6. The transparent copolyamide according to claim 1, wherein the melt viscosity of said copolyamide as measured at 280° C. and a shear rate of 100 sec$^{-1}$ is 5,000 to 24,000 poise.

* * * * *